(12) United States Patent
Treglown

(10) Patent No.: US 12,221,056 B2
(45) Date of Patent: Feb. 11, 2025

(54) SIDE PANEL KNEE AIRBAGS AND RELATED ASSEMBLIES

(71) Applicant: Autoliv ASP, Inc., Ogden, UT (US)

(72) Inventor: Aaron Treglown, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/127,596

(22) Filed: Mar. 28, 2023

(65) Prior Publication Data
US 2024/0326732 A1  Oct. 3, 2024

(51) Int. Cl.
| | |
|---|---|
| *B60R 21/2338* | (2011.01) |
| *B60R 21/217* | (2011.01) |
| *B60R 21/231* | (2011.01) |

(52) U.S. Cl.
CPC ........ *B60R 21/2338* (2013.01); *B60R 21/217* (2013.01); *B60R 2021/23169* (2013.01); *B60R 2021/23382* (2013.01)

(58) Field of Classification Search
CPC ...... B60R 2021/23169; B60R 21/2338; B60R 21/217; B60R 2021/23382; B60R 21/16
See application file for complete search history.

(56) References Cited

U.S. PATENT DOCUMENTS

| | | | |
|---|---|---|---|
| 2007/0222189 A1 | 9/2007 | Baumbach | |
| 2011/0101660 A1 | 5/2011 | Schneider | |
| 2018/0345899 A1* | 12/2018 | Munsee | B60R 21/233 |
| 2022/0242354 A1* | 8/2022 | Nakajima | B60R 21/231 |

FOREIGN PATENT DOCUMENTS

| | | | | |
|---|---|---|---|---|
| WO | WO-2014106071 A1 * | 7/2014 | ............ | B60R 21/231 |
| WO | 2014197378 | 12/2014 | | |

OTHER PUBLICATIONS

ISR—PCTUS2024019796 (4 pgs).
WO—PCTUS2024019796 (4 pgs).

* cited by examiner

*Primary Examiner* — Jason D Shanske
*Assistant Examiner* — Scott Lawrence Strickler
(74) *Attorney, Agent, or Firm* — Matthew D. Thayne; Thayne and Davis LLC

(57) ABSTRACT

Airbag cushions and related assemblies configured to protect the lower extremities of a vehicle occupant and reduce the chances of leg slide off during deployment using one or more side panels. In some embodiments, the assembly may comprise an inflatable cushion comprising a top panel, a bottom panel coupled with the top panel, and two side panels, which may be coupled with the top and bottom panels. The side panels may be positioned, in an inflated configuration, opposite from one another and may be configured, upon deployment, to increase surface area contact with the occupant's lower extremities and/or to inhibit the occupant's lower extremities from sliding off of the inflatable cushion during deployment.

20 Claims, 11 Drawing Sheets

SIDE PANEL KNEE AIRBAGS AND RELATED ASSEMBLIES

SUMMARY

Airbag cushions are often configured to provide protection to a vehicle occupant's lower extremities. However, the contours of this region of a vehicle often introduce difficulties that can render deployment kinematics less than ideal. To control the profile/shape of the cushion, internal shape-forming tethers are often used in the proximal contact region of the cushion However, the increased pressure and/or shapes resulting from such tethers can result in functional challenges and the exclusion of such tethers often leads to problems with leg slide off.

The present inventors have therefore determined that it would be desirable to provide apparatus, systems and methods that overcome one or more of the foregoing limitations and/or other limitations of the prior art. In some embodiments, the inventive concepts disclosed herein may therefore provide a more effective shape in reducing the incidence of leg slide. In preferred embodiments, this may be accomplished by providing side panels that preferably extend all the way to the proximal contact surface of the cushion. In some embodiments, internal shape-forming tethers may be omitted from the proximal contact region of the cushion, such as the entire region in between the side panels following deployment in some embodiments.

In a more particular example of an airbag cushion assembly according to some embodiments, the airbag cushion assembly may comprise an inflatable cushion configured to provide protection to an occupant's lower extremities during an impact event, such as, for example, an inflatable cushion configured to be deployed adjacent to a vehicle steering column to provide such protection to a driver's knees and/or lower legs. In some embodiments, the inflatable cushion may comprise a top panel, a bottom panel coupled with the top panel, and one or more side panels coupled with the top and bottom panels. Thus, for example, some embodiments may comprise a first side panel coupled with the top and bottom panels, and a second side panel coupled with the top and bottom panels. The second side panel may be positioned, in an inflated configuration, opposite from the first side panel. The first and second side panels may be configured, upon deployment, to increase surface area contact with the occupant's lower extremities and inhibit the occupant's lower extremities from sliding off of the inflatable cushion during deployment.

In some embodiments, the inflatable cushion may be devoid of internal tethers within a region extending between the first side panel and the second side panel for decreasing a profile thickness of the inflatable cushion during deployment.

In some such embodiments, the inflatable cushion may comprise a throat region and may further comprise at least one internal tether, which may be a shape forming internal tether, positioned within the throat region.

Some embodiments may comprise one or more side panels that extend around and/or form a corner region of a proximal contact surface. In some such embodiments, these corners may protrude slightly in a proximal direction towards an occupant relative to the proximal surface defined by other portions of the cushion, such as the proximal surface defined by the top and/or bottom panels of the cushion, for example.

In some embodiments, the first side panel and/or the second side panel may extend only partially from a proximal end of the inflatable cushion towards a distal end of the inflatable cushion following deployment without extending all the way to the distal end.

In some embodiments, the first side panel and/or the second side panel may be configured to form respective concave surfaces on opposite sides of the inflatable cushion following deployment.

In some embodiments, the first and/or second side panels may be defined by a first partial side panel and a second partial side panel sewn to the first partial side panel along respective peripheral edges of the first side partial side panel and the second partial side panel.

In some embodiments, one or both of the first and second side panels may taper at a distal end thereof to a point at which the top panel, the bottom panel, and the respective first panel or second panel meet.

In an example of an airbag cushion module according to some embodiments, the module may comprise an inflatable cushion, which may comprise a throat region configured to receive, at least in part, an inflator. The inflatable cushion may further comprise a proximal contact region configured to receive and directly engage a vehicle occupant's knees during deployment. The proximal contact region may be devoid of internal tethers for reducing a profile height of the proximal contact region and/or may be defined, at least in part, by one or more (in some cases, two opposing) side panels, which may extend along one or both of two opposing lateral sides of the proximal contact region of the inflatable cushion during deployment.

In some embodiments, the proximal contact region may be configured to inhibit the vehicle occupant's knees from sliding off of the inflatable cushion during deployment.

In some embodiments, the proximal contact region may be configured to increase surface area contact with the vehicle occupant's knees during deployment.

In some embodiments, one or both of the opposing side panels may extend from respective opposite sides of a proximal contact surface of the proximal contact region following deployment. In some such embodiments, one or both of the opposing side panels may terminate at a location spaced apart from and proximal of a distal end of the inflatable cushion following deployment. In some such embodiments, one or both of the opposing side panels may terminate at a location spaced apart from and proximal of the throat region following deployment.

In some embodiments, proximal and/or distal boundaries of the proximal contact region may be defined by the opposing side panels.

In another example of an airbag cushion assembly according to some embodiments, the assembly may comprise an inflatable cushion configured to be deployed to provide protection to a vehicle occupant's knees during an impact event. The inflatable cushion may comprise an upper panel, a lower panel coupled with the upper panel, a first side panel coupled between the upper panel and the lower panel, and a second side panel coupled between the upper panel and the lower panel opposite from the second side panel. In some embodiments, the inflatable cushion may be devoid of internal tethers between the first side panel and the second side panel that are configured to reduce a profile thickness of the inflatable cushion during deployment.

In some embodiments, the upper panel may be directly coupled to the lower panel along a first portion of the inflatable cushion. The upper panel may be indirectly coupled to the lower panel along a second portion of the inflatable cushion with the first side panel being positioned in between the upper panel and the lower panel along a first side of the inflatable cushion and the second panel being positioned in between the upper panel and the lower panel along a second side of the inflatable cushion opposite the first side, following deployment.

In some embodiments, the first side panel may extend along no more than about half of a length of the upper panel, preferably along the proximal portion of the cushion.

In some embodiments, the first side panel and/or the second side panel may be configured to form respective concave surfaces on opposite sides of the inflatable cushion following deployment.

In some embodiments, the first and second side panels may be configured to inhibit the vehicle occupant's knees from sliding off of the inflatable cushion during deployment.

In some embodiments, the first and second side panels may be configured to increase surface area contact with the vehicle occupant's knees during deployment.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
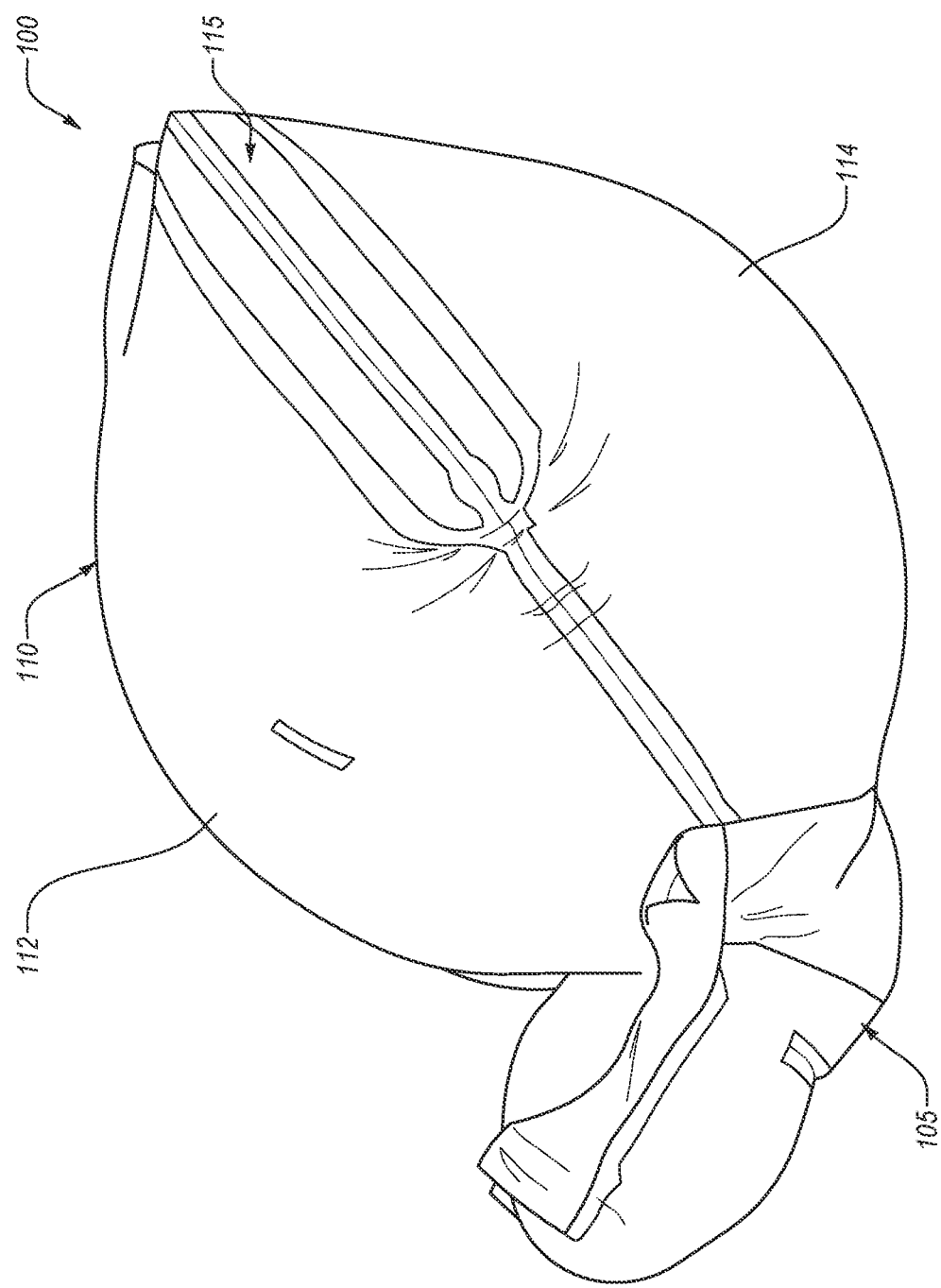
FIG. 1 is a perspective view of an airbag assembly according to some embodiments following deployment.

FIG. 1 depicts an airbag cushion assembly 100 according to some embodiments. Airbag cushion assembly 100 comprises a cushion defining a throat region 105, which may be configured to receive, wholly or partially, a housing and/or inflator configured to inflate the airbag cushion. In preferred embodiments, and as discussed in greater detail below, airbag cushion assembly 100 is configured to be deployed adjacent to a vehicle steering column or another lower region of the vehicle to provide protection to an occupant's (most typically a driver's) knees and/or other lower extremities during an impact event.

As illustrated in FIG. 1, the inflatable cushion further comprises a proximal contact region 110, which, as described below, defines the structure that is configured to ultimately engage a vehicle occupant's legs and/or other lower extremities. The proximal contact region 110 is defined by a top or front panel 112 and a bottom or lower panel 114 and is at least partially defined by a pair of side panels 115, one of which is visible in FIG. 1 and the other of which is not visible but would typically be positioned at a similar location on the opposite side of the cushion.

As shown in FIG. 1, along with subsequent figures discussed below, the side panels 115 extend from the proximal contact surface 116 of the cushion (see FIG. 2) at opposite sides of the cushion to a midpoint of the cushion in between proximal contact surface 116 and the throat region 105. In some embodiments, one or both of the side panels 115A and 115B may extends along no more than about half of a length of the upper panel 112, the lower panel 114, and/or the proximal contact region 110. It can also be seen in FIG. 1 that the side panels taper to a point at which each side panel 115 joins with the adjacent upper panel 112 and lower panel 114.

Providing side panels 115A and 115B may provide a number of benefits. For example, although many knee airbag cushions include several internal tethers within the proximal contact region of the cushion, which internal tethers are used to maintain a desired shape and/or increase cushion pressure, such tethers have several drawbacks, including cost, lower contact area with the occupant's knees and/or lower legs/tibias, and promoting undesirable slide off of the legs, due to the presence of increased force from the cushion on the inside of the occupant's legs relative to the outer legs.

Thus, in preferred embodiments, the cushions disclosed herein may lack internal tethers, or may at least lack internal tethers in the proximal contact region defining the shape of the portion of the cushion that will contact the knees and/or lower legs of the vehicle occupant. This may allow for increased contact area with the knees and lower legs and/or may provide a flattened proximal contact surface, which may result in improved restraint, reduce leg slide off, improved cushion robustness due to lower working pressures, and/or reduced costs. However, as will be discussed later, some embodiments may still have one or more internal tethers in other regions, such as the throat region 105.

Figure 2:
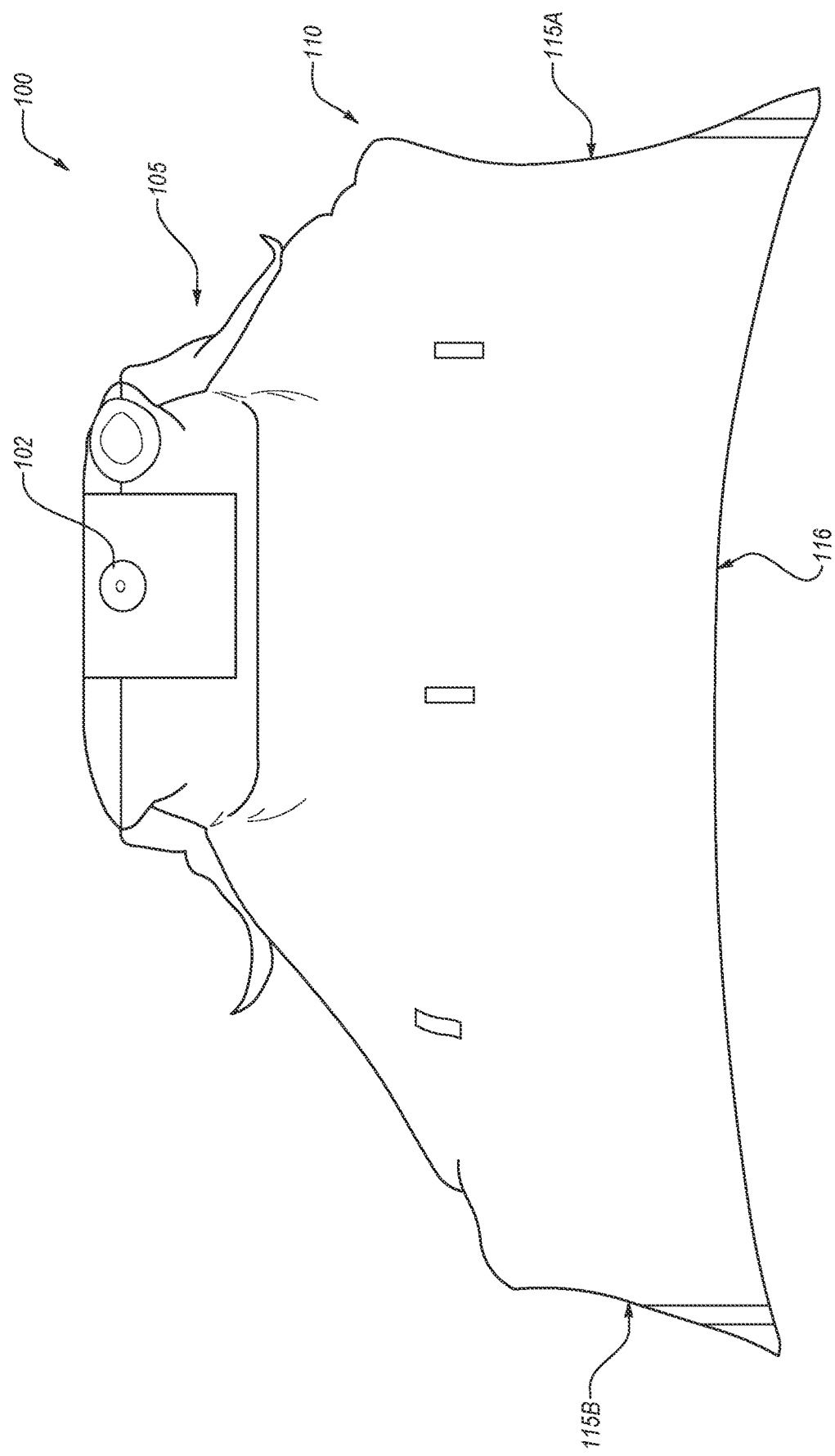
FIG. 2 is a top plan view of the airbag assembly of FIG. 1.
Figure 3:
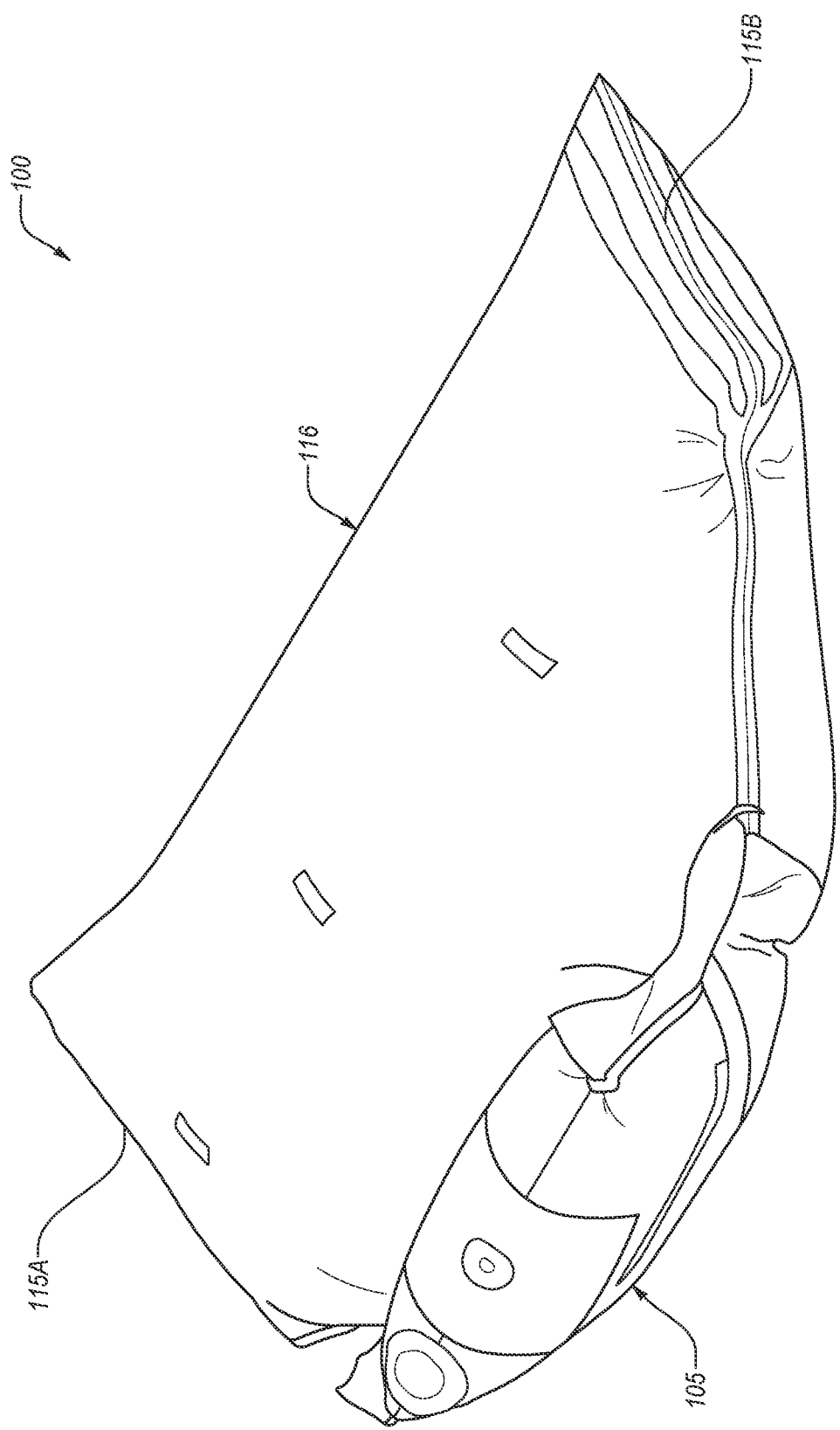
FIG. 3 is a side perspective view of the airbag assembly of FIGS. 1 and 2.

FIG. 2 is a top plan view of the cushion of assembly 100 following deployment. As shown in this figure, along with the side perspective view of FIG. 3, an inflator 102 may be positioned within, or otherwise fluidly coupled with, the throat region 105 of the cushion. The view of FIG. 2 further illustrates how the opposing side panels 115A and 115B are, in some embodiments, configured to define concavities and/or concave surfaces following deployment, which may result in the proximal contact surface 116 also comprising a slightly concave surface, which may further enhance the ability of the cushion to resist leg slide off.

Figure 4:
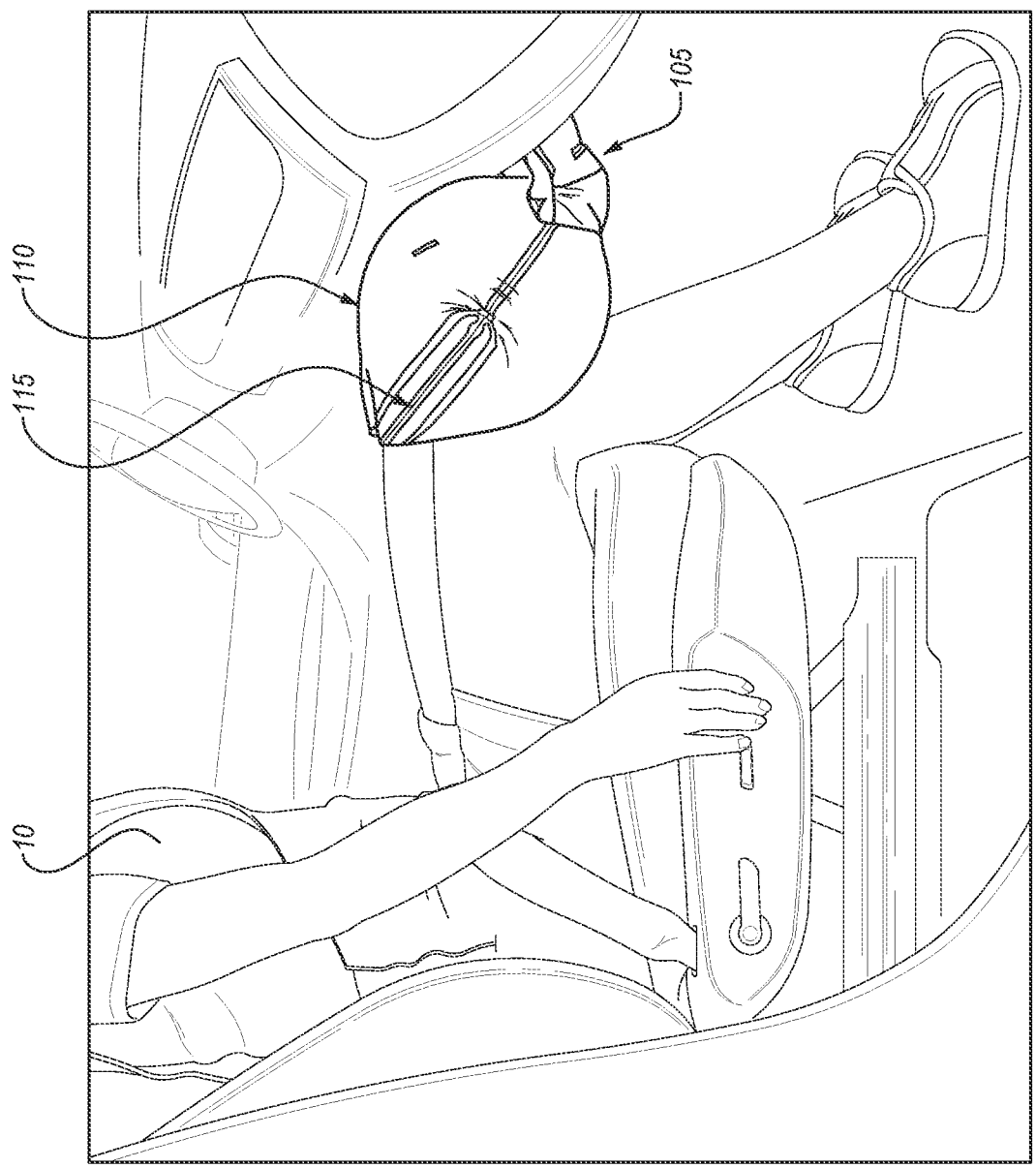
FIG. 4 depicts the airbag assembly positioned within a vehicle during deployment against a vehicle occupant's knees and lower legs.
Figure 5:
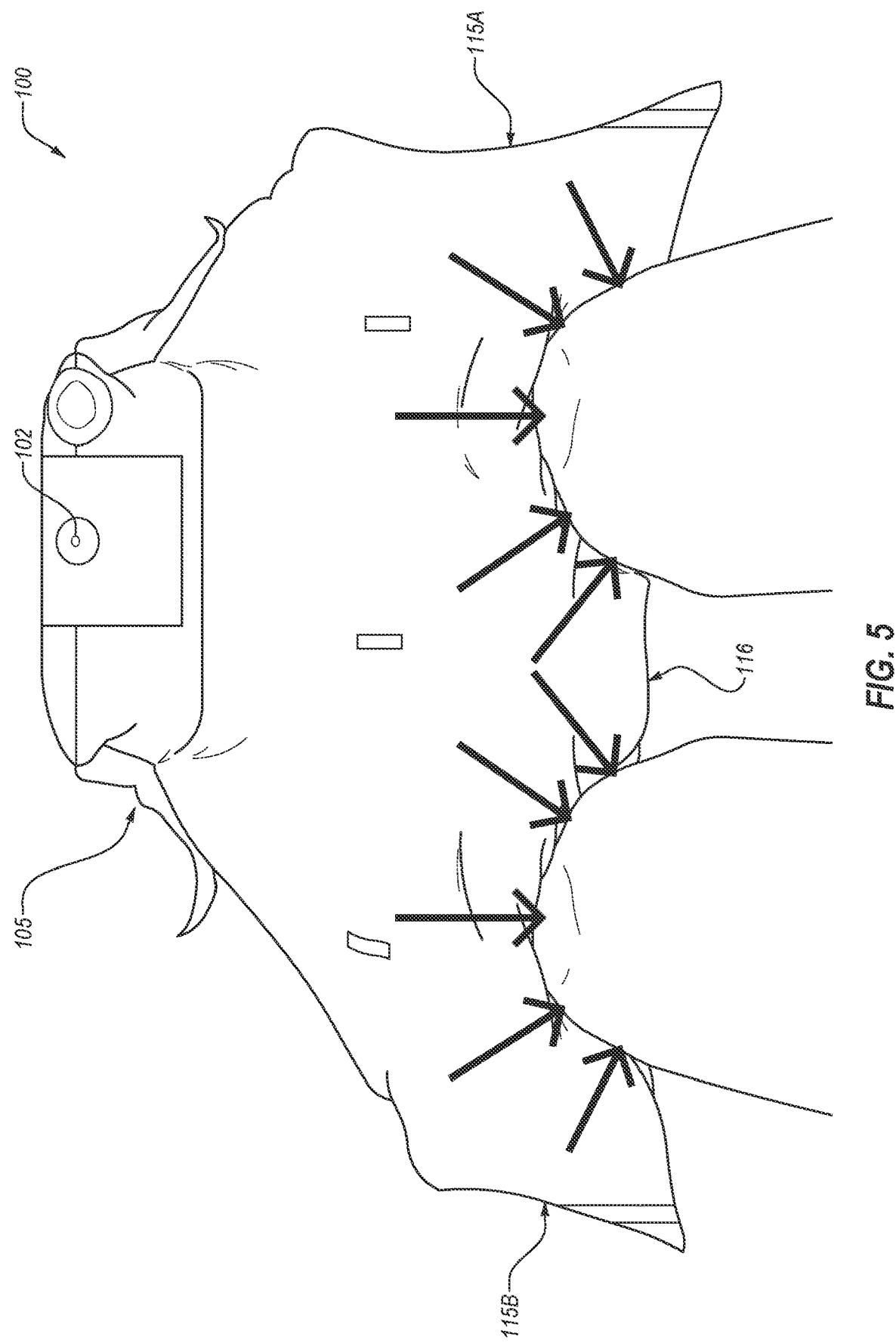
FIG. 5 is an enlarged view of the airbag cushion contacting the occupant's knees and inhibiting slide off of the occupant's legs.

FIGS. 4 and 5 depict the cushion during deployment adjacent to a vehicle occupant 10. As shown in these figures, the occupant's knees contact the proximal contact surface 116 of the proximal contact region 110 and, due to the presence of the side panels 115A/115B and/or the lack of internal tethers in at least the proximal contact region 110 of the cushion, the knees are able to extend further into the cushion than typical knee airbag cushions comprising internal tethers in the proximal region of the cushion. This provides increased contact area with the knees, provides a flattened and, in some cases, concave proximal contact surface 116, which, without being limited by theory, is considered to improve resistance to leg slide off.

Figure 6:
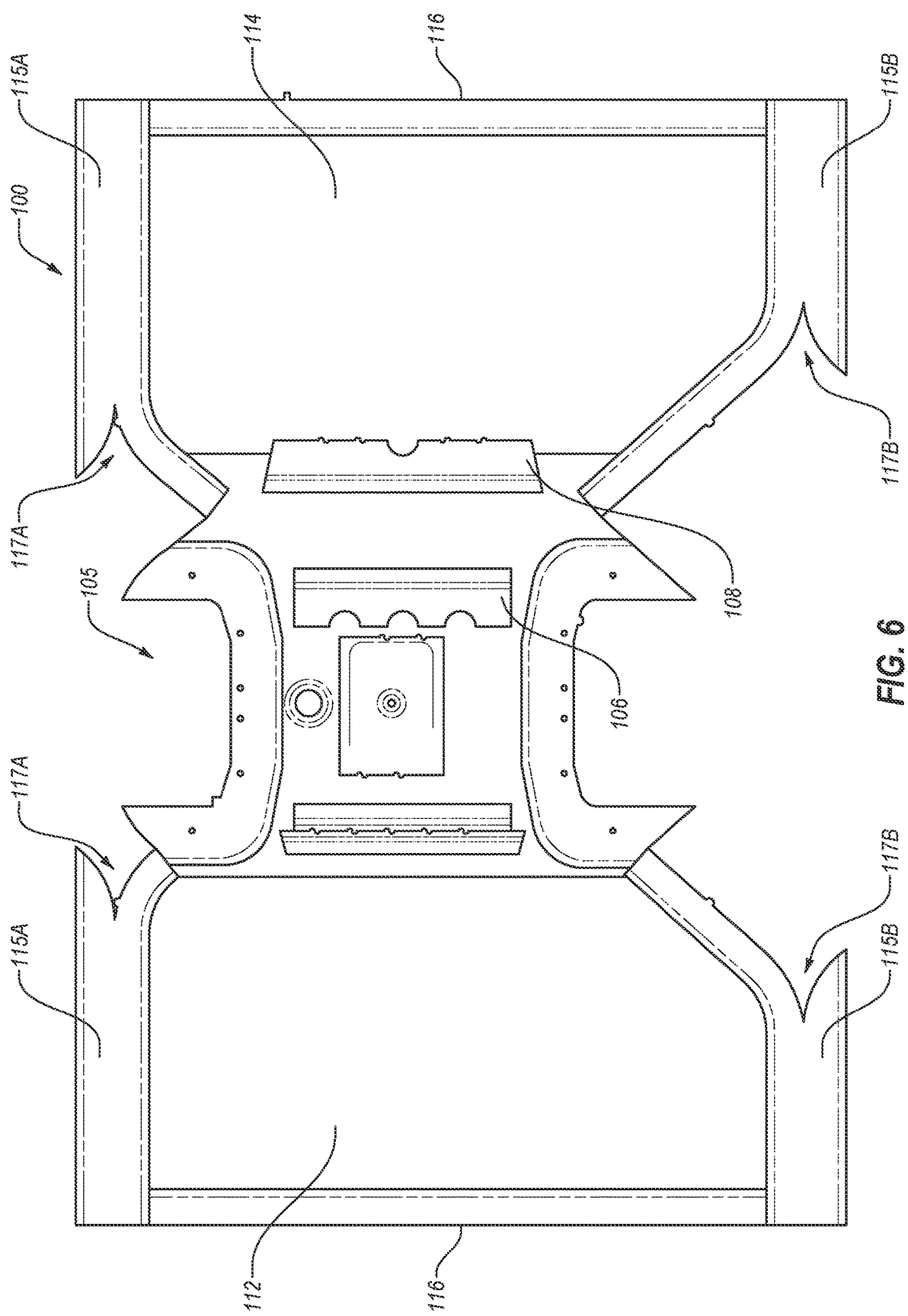
FIG. 6 depicts a fabric material blank configured to be assembled into an inflatable cushion according to some embodiments.

FIG. 6 is a plan view of a fabric panel or blank according to some embodiments for manufacturing an airbag cushion comprising the aforementioned side panels. As shown in this figure, two internal tethers 106 and 108 may be provided. However, as previously mentioned, these tethers 106/108 are wholly absent from the region of the cushion defined between the opposing side panels 115A and 115B. As discussed above, the presence and/or shape of the side panels 115A/115B, in some embodiments along with the absence of internal, shape forming/profile decreasing tethers in this proximal region of the cushion may improve performance of the cushion during deployment, such as reducing leg slide off during deployment.

Additional features are best seen in FIG. 6. For example, both of the partial side panels 115A, along with both of the partial side panels 115B on the opposite side, comprise a concave inset feature 117A and 117B, respectively. In the depicted embodiment, these features 117A/117B comprise a concavity terminating at a sharp point, which in the depicted embodiment delineates the boundary between the respective side panels and the adjacent distal region defined by the respective top panel 112 and bottom panel 114. These concavities may facilitate desired deployment characteristics, such as creating a concavity in the three-dimensional cushion at the respective side panels 115A/115B following deployment, which may facilitate maintenance of a desired flattened and/or concave shape along the proximal contact surface 116 to inhibit leg slide off. However, this concavity need not be present in all contemplated embodiments. Moreover, in embodiments comprising a concavity, it may comprise a concavity defined by curved lines rather than ones terminating in a sharp, discrete point.

Figure 7:
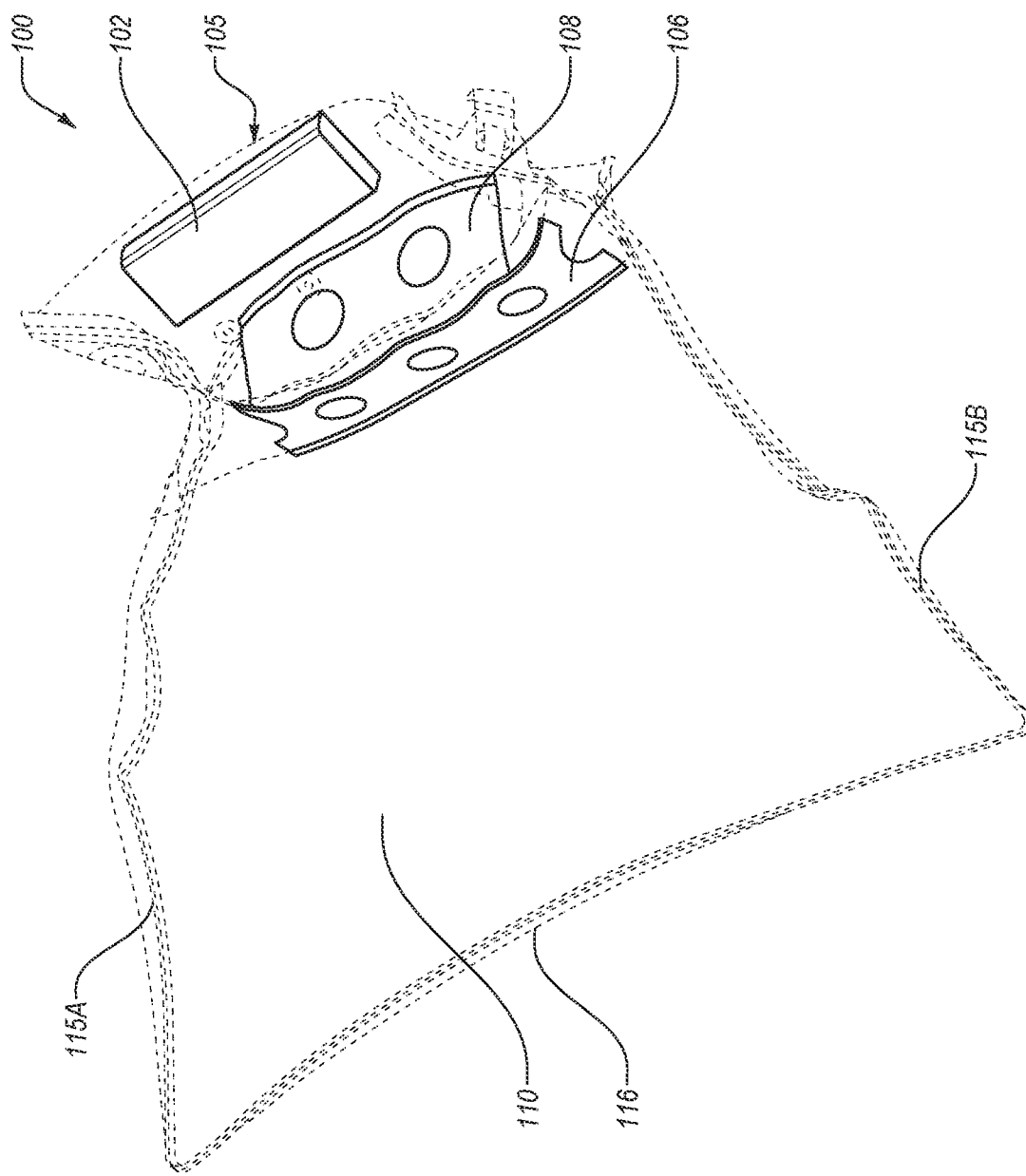
FIG. 7 is a transparency view of the inside of the complete cushion during deployment.

FIG. 7 depicts the inside of the cushion during deployment. As shown in this figure, the proximal contact region 110 of the cushion is wholly lacking in any internal tethers. Although it should be understood that, in some alternative embodiments, internal tethers may be used in this region for purposes other than reducing the profile of the cushion, such as opening vent holes and the like. Also, the presence of internal tethers 106 and 108 can be seen in throat region 105 adjacent to inflator 102. Thus, again, although preferred embodiments lack profile/shape restraining internal tethers in the proximal contact region 110, there may be such internal tethers located distal of the proximal contact region 110, such as in the throat region 105.

Figure 8:
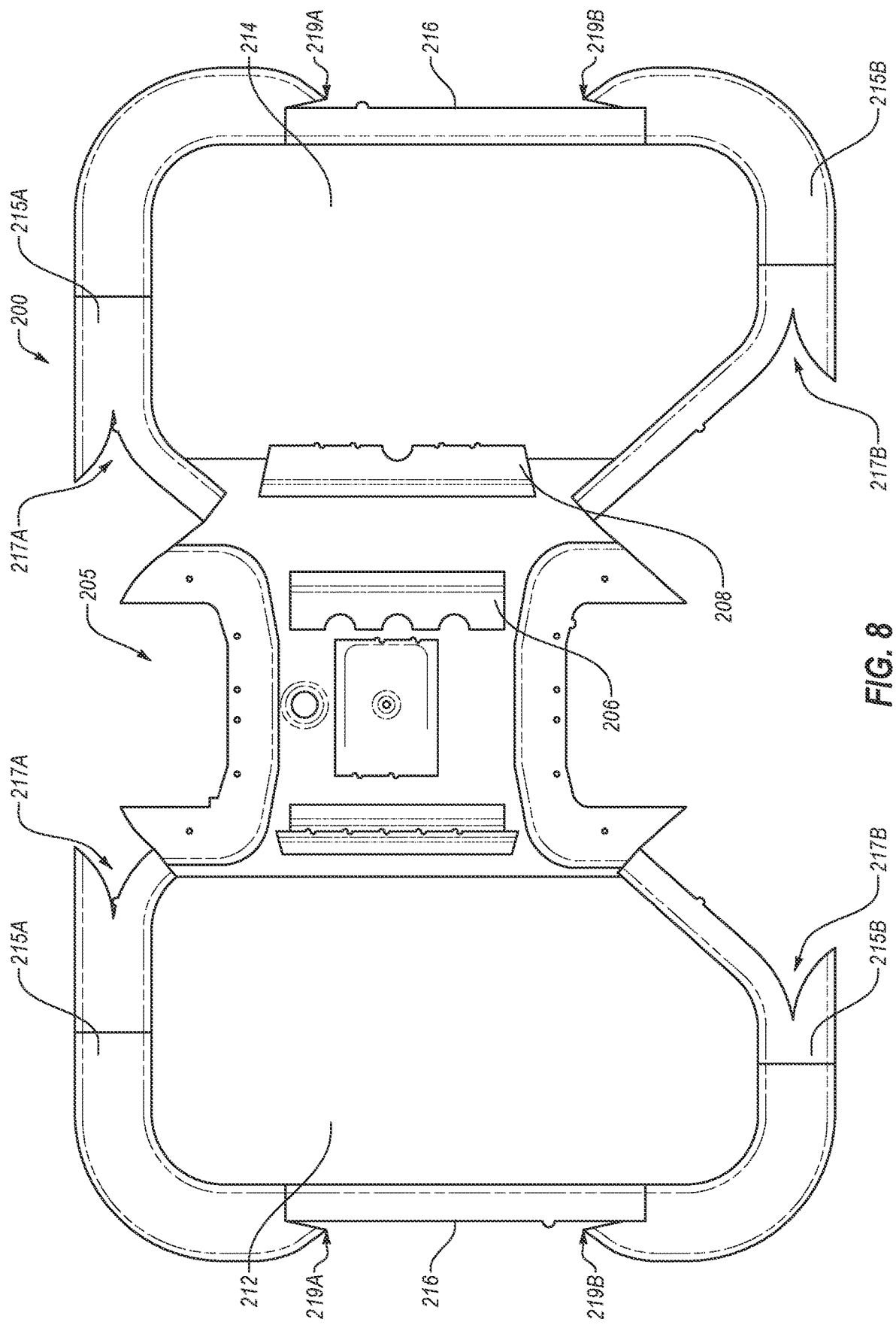
FIG. 8 depicts a fabric material blank configured to be assembled into an inflatable cushion according to other embodiments.

FIG. 8 depicts a fabric material blank 200 configured to be assembled into an inflatable cushion according to other embodiments. As shown in this figure, two internal tethers 206 and 208 may again be provided, if desired. However, these tethers 206/208 are preferably wholly absent from the region of the cushion defined between the opposing side panels 215A and 215B. As discussed throughout this disclosure, the presence and/or shape of the side panels 215A/215B, in some embodiments along with the absence of internal, shape forming/profile decreasing tethers in this proximal region of the cushion may improve performance of the cushion during deployment, such as reducing leg slide off during deployment.

The material blank 200 shown in FIG. 8 differs from that shown in FIG. 6 in a few important ways, and also demonstrates the diversity of design factors that may be used to improve performance for particular applications without losing certain important characteristics that multiple embodiments may share in common and/or without departing from certain fundamental characteristics and/or features of such embodiments.

For example, although, as is the case with the blank 100 of FIG. 6, blank 200 comprises side panels 215A/215B, these side panels 215A/215B extend not only along respective sides of the blank and resulting cushion 200, but also wrap around in both opposing directions away from throat region 205. Because these sub-portions of the respective side panels 215A/215B are configured to be folded and coupled together to form an inflatable cushion, they will ultimately both extend in the same direction, i.e., away from the throat region 205 and proximally towards a vehicle occupant. Thus, these aforementioned regions of side panels 215A/215B that wrap around will ultimately form corner regions of the cushion and, more particularly, corner regions of a proximal contact region of the cushion.

In addition, both of the partial side panels 215A, along with both of the partial side panels 215B on the opposite side, comprise a concave inset feature 217A and 217B, respectively. In the depicted embodiment, these features 217A/217B comprise a concavity terminating at a sharp point, which may delineate a boundary between the respective side panels and the adjacent distal region defined by the respective top panel 212 and bottom panel 214. These concavities may facilitate desired deployment characteristics, such as creating a concavity in the three-dimensional cushion at the respective side panels 215A/215B following deployment, which may facilitate maintenance of a desired flattened and/or concave shape along the proximal contact surface 216 to inhibit leg slide off. However, this concavity need not be present in all contemplated embodiments and, in those embodiments in which such concavity(ies) are present, they may comprise a concavity defined by curved lines rather than ones terminating in a sharp, discrete point.

In the embodiment of FIG. 8, partial side panels 215A, along with partial side panels 215B, further comprise similar inset and/or concave features 219A and 219B at their opposite ends—i.e., the ends that wrap around the proximal portion of the cushion to form extended corner regions. Again, these features 219A/219B may create respective concavities or inset regions in the resulting, deployed cushion along the proximal portion of the cushion at the borders of these corner regions. As with features 217A/217B, features 219A/219B are shown in the depicted embodiment as terminating in respective sharp points, but need not do so in all contemplated embodiments.

Figure 9:
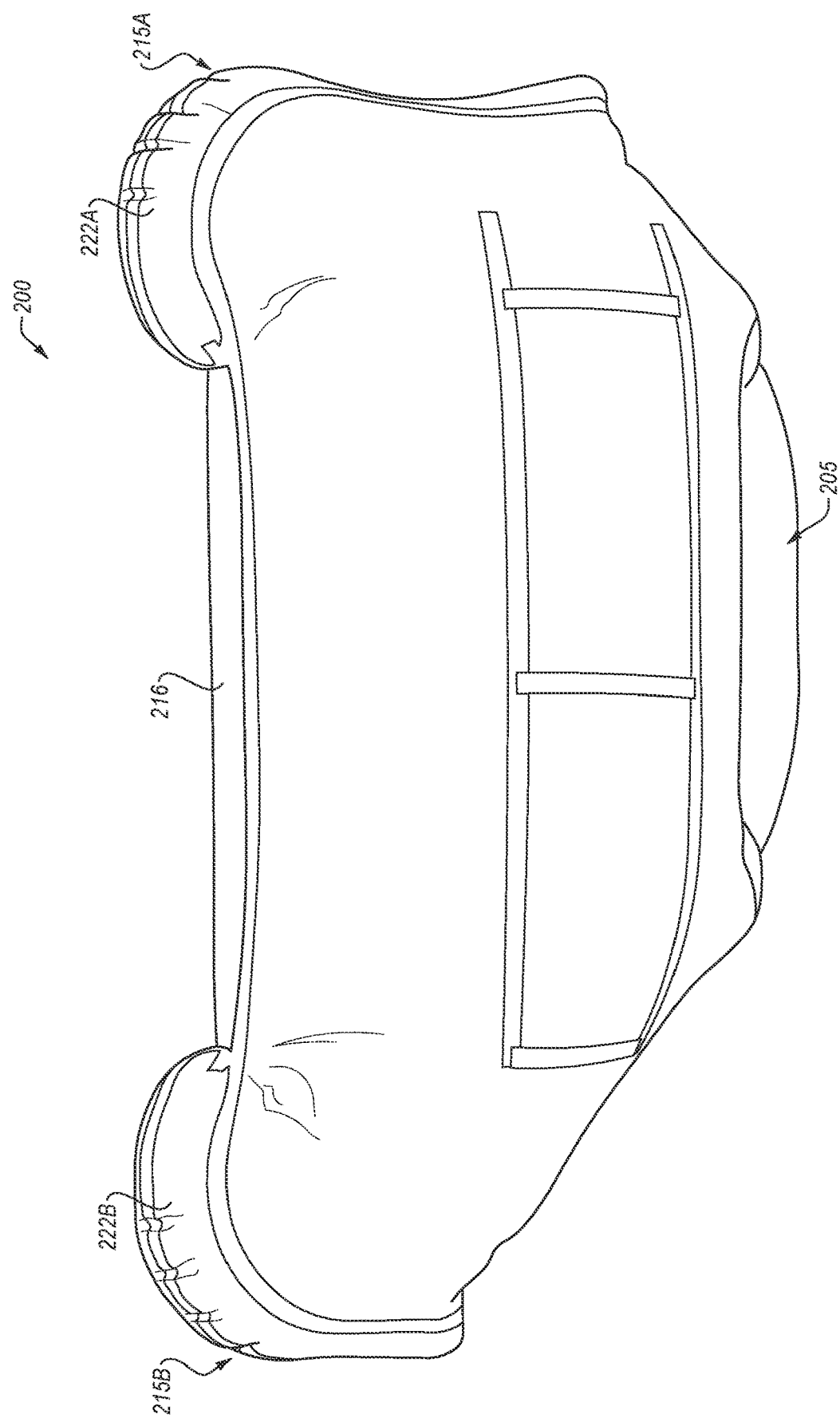
FIG. 9 is a perspective view of an airbag assembly manufactured using the material blank of FIG. 8 following deployment.
Figure 10:
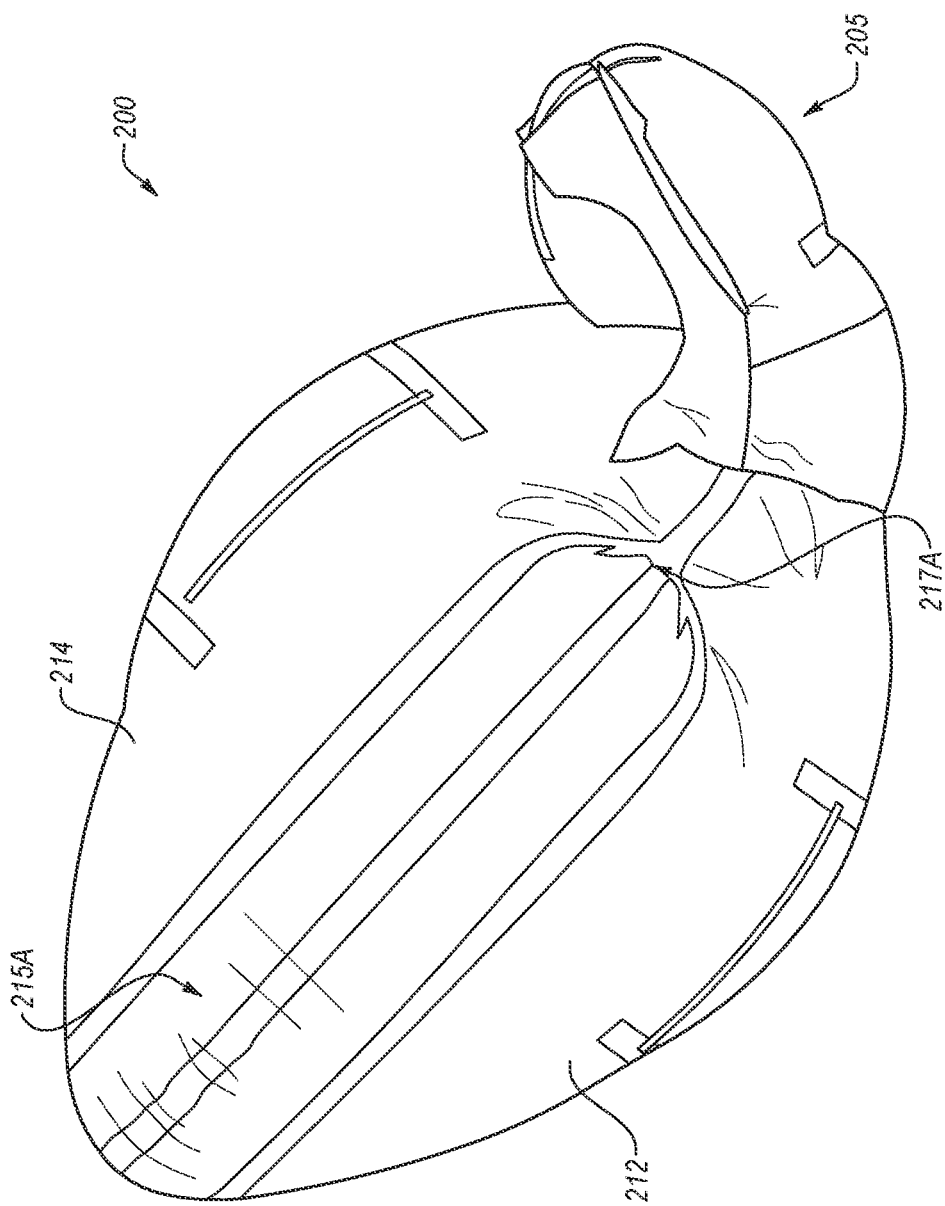
FIG. 10 is a first side perspective view of the airbag assembly of FIG. 9 following deployment.
Figure 11:
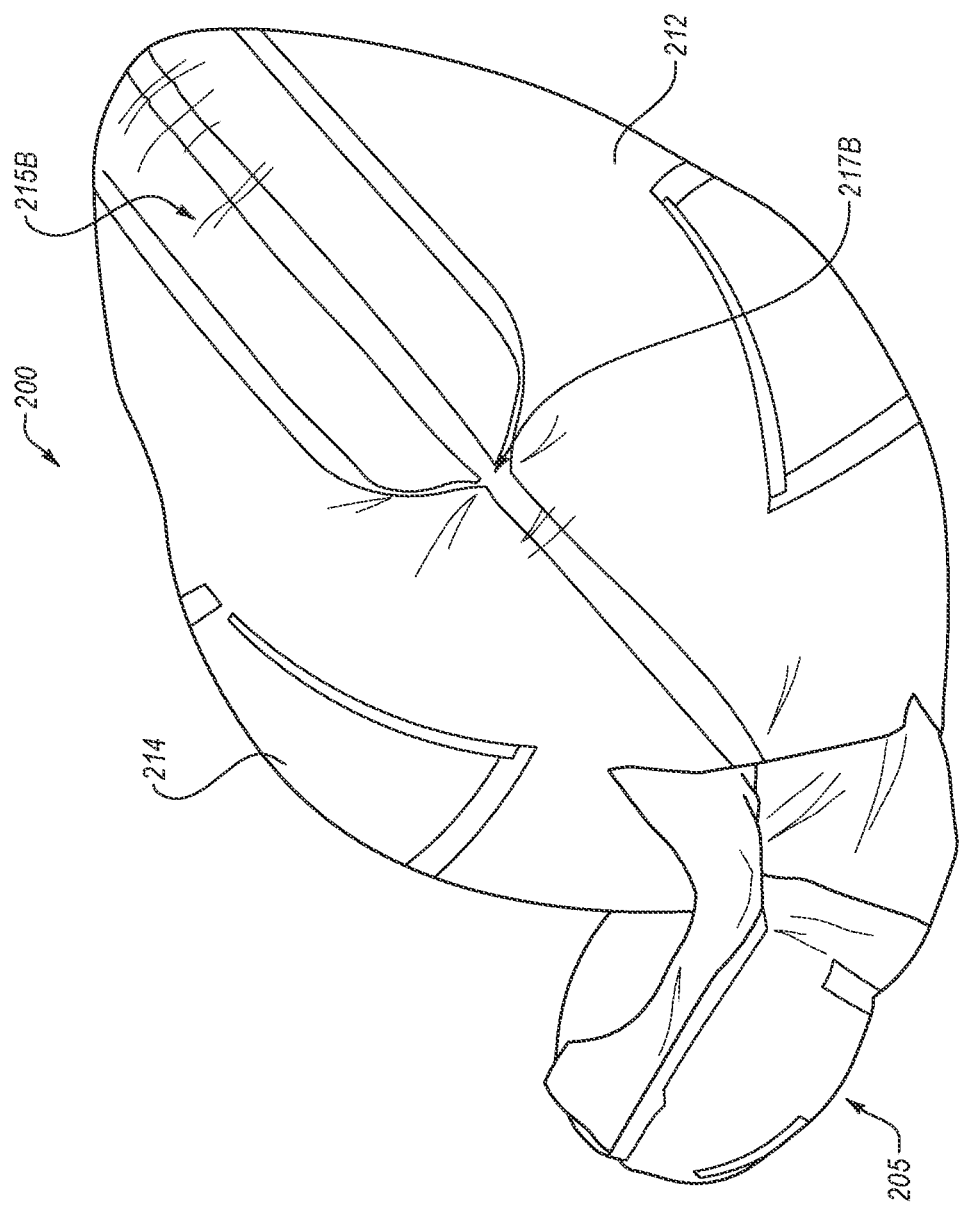
FIG. 11 is a second side perspective view opposite from the side depicted in FIG. 10 of the airbag assembly of FIG. 9 following deployment.

Moreover, as better seen in FIGS. 9-11, which depict a cushion 200 manufactured from the blank of FIG. 8 following deployment, the manner in which panels 215A/215B both wrap around and extend beyond the periphery of adjacent portions of the cushion, such as the portions formed proximal contact surface 216, may also allow for the fully formed corner regions 222A/222B of the cushion to protrude, in some cases both proximally and laterally, as best seen in FIG. 9. These protruding corners 222A/222B may, in some embodiments, further enhance the ability of the cushion to inhibit leg slide off.

As also shown in FIG. 9, and as can also be seen in the blank of FIG. 8, side panel 215A is longer than side panel 215B along the respective sides of the cushion 200. This may be useful to form a cushion that accommodates certain vehicle features and/or improves performance for certain vehicles and/or applications. Although in the depicted embodiment there are no internal tethers between the two side panels 215A/215B, because of the longer length of side panel 215A, it is contemplated that some embodiments may only omit internal tethers in a region of the cushion defined between the shorter of the two side panels (in this case side panel 215B) and the corresponding opposite side panel (in this case side panel 215A). In other words, there may be an internal tether adjacent to a distal portion of the longer side panel 215A in some contemplated embodiments, due to its longer length. Thus, some embodiments may lack internal tethers in a region of the cushion defined by a shorter of the two side panels and extending to the proximal contact surface of the cushion.

It is also contemplated that some embodiment may only have a single side panel. Thus, for example, it is contemplated that any of the embodiments disclosed, discussed, and/or contemplated herein may be modified to remove one of the opposing side panels and may still achieve benefits, albeit reduced in some cases, relative to prior art cushions lacking any such side panels as described herein.

FIG. 10 is a first side perspective view of the airbag cushion 200 following deployment and FIG. 11 is a second side perspective view opposite from the side depicted in FIG. 10 of the airbag cushion 200 following deployment. As shown in these two additional views, the opposing side panels 215A/215B may terminate at respective points resulting from the inset and/or concave features 219A and 219B shown in FIG. 8. These two figures also better illustrate the optional differing lengths of the opposing side panels 215A/215B and the manner in which they extend partially along the sides of the cushion and wrap around the proximal contact surface 216 to form respective protruding corners 222A/222B.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
an inflatable cushion configured to provide protection to an occupant's lower extremities during an impact event, wherein the inflatable cushion comprises:
a top panel;
a bottom panel coupled with the top panel;
a side panel coupled with the top and bottom panels, wherein the side panel is configured, upon deployment, to increase surface area contact with the occupant's lower extremities and inhibit the occupant's lower extremities from sliding off of the inflatable cushion during deployment; and
a second side panel coupled with the top and bottom panels and positioned, in an inflated configuration, opposite from the side panel, wherein the side panel and the second side panel extend only partially from a proximal end of the inflatable cushion towards a distal end of the inflatable cushion following deployment without extending all the way to the distal end.

2. The airbag cushion assembly of claim 1, wherein the inflatable cushion is devoid of internal tethers within a region extending between the side panel and the second side panel for decreasing a profile thickness of the inflatable cushion during deployment.

3. The airbag cushion assembly of claim 1, wherein the inflatable cushion comprises a throat region, and further comprising at least one internal tether positioned within the throat region.

4. The airbag cushion assembly of claim 1, wherein the side panel and the second side panel are configured to form respective concave surfaces on opposite sides of the inflatable cushion following deployment.

5. The airbag cushion assembly of claim 1, wherein the side panel and/or the second side panel is defined by a first partial side panel and a second partial side panel sewn to the first partial side panel along respective peripheral edges of the first side partial side panel and the second partial side panel.

6. The airbag cushion assembly of claim 1, wherein the side panel and the second side panel both taper at a distal end thereof to a point at which the top panel, the bottom panel, and the respective side panel or second panel meet.

7. The airbag cushion assembly of claim 1, wherein the inflatable cushion is configured to extend towards both of the occupant's lower extremities to at least substantially equal degree.

8. An airbag cushion module, comprising:
an inflatable cushion, comprising:
a throat region configured to receive, at least in part, an inflator;
a proximal contact region configured to receive and directly engage a vehicle occupant's knees during deployment, wherein the proximal contact region is devoid of internal tethers for reducing a profile height of the proximal contact region, and wherein the proximal contact region is defined, at least in part, by at least one side panel extending along a lateral side of the proximal contact region of the inflatable cushion during deployment.

9. The airbag cushion module of claim 8, wherein the proximal contact region is configured to inhibit the vehicle occupant's knees from sliding off of the inflatable cushion during deployment.

10. The airbag cushion module of claim 9, wherein the proximal contact region is configured to increase surface area contact with the vehicle occupant's knees during deployment.

11. The airbag cushion module of claim 8, wherein the proximal contact region is defined, at least in part, by opposing side panels extending along opposing lateral sides of the proximal contact region of the inflatable cushion during deployment, wherein the opposing side panels extend from respective opposite sides of a proximal contact surface of the proximal contact region following deployment, and wherein the opposing side panels terminate at a location spaced apart from and proximal of a distal end of the inflatable cushion following deployment.

12. The airbag cushion module of claim 11, wherein the opposing side panels terminate at a location spaced apart from and proximal of the throat region following deployment, and wherein the opposing side panels extend proximally to form respective corners of the inflatable cushion.

13. The airbag cushion module of claim 8, wherein the proximal contact region is defined, at least in part, by opposing side panels extending along opposing lateral sides of the proximal contact region of the inflatable cushion during deployment, and wherein proximal and distal boundaries of the proximal contact region are defined by the opposing side panels.

14. The airbag cushion module of claim 8, wherein the proximal contact region is at least substantially symmetrical between the at least one side panel and an opposite side of the proximal contact region.

15. An airbag cushion assembly, comprising:
an inflatable cushion configured to be deployed to provide protection to a vehicle occupant's knees during an impact event, wherein the inflatable cushion comprises:
an upper panel;
a lower panel coupled with the upper panel;
a first side panel coupled between the upper panel and the lower panel; and
a second side panel coupled between the upper panel and the lower panel opposite from the second side panel, wherein the inflatable cushion is devoid of internal tethers between the first side panel and the second side panel that are configured to reduce a profile thickness of the inflatable cushion during deployment.

16. The airbag cushion assembly of claim 15, wherein the upper panel is directly coupled to the lower panel along a first portion of the inflatable cushion, and wherein the upper panel is indirectly coupled to the lower panel along a second portion of the inflatable cushion with the first side panel being positioned in between the upper panel and the lower panel along a first side of the inflatable cushion and the second side panel being positioned in between the upper panel and the lower panel along a second side of the inflatable cushion opposite the first side, following deployment.

17. The airbag cushion assembly of claim 15, wherein the first side panel extends along no more than about half of a length of the upper panel.

18. The airbag cushion assembly of claim 15, wherein the first side panel and the second side panel are configured to form respective concave surfaces on opposite sides of the inflatable cushion following deployment.

19. The airbag cushion assembly of claim 15, wherein the first and second side panels are configured to inhibit the vehicle occupant's knees from sliding off of the inflatable cushion during deployment.

20. The airbag cushion assembly of claim 15, wherein the first and second side panels are configured to increase surface area contact with the vehicle occupant's knees during deployment.

* * * * *